United States Patent
Holmes

(10) Patent No.: US 11,009,064 B2
(45) Date of Patent: May 18, 2021

(54) PRESS-ON RING FOR IMPROVING PULL-OUT PERFORMANCE IN NON-FERROUS JOINT OR CONNECTION APPLICATIONS

(71) Applicant: ZF Friedrichshafen AG, Friedrichshafen (DE)

(72) Inventor: Eric Holmes, Ann Arbor, MI (US)

(73) Assignee: FRIEDRICHSHAFEN, Friedrichshafen (DE)

( * ) Notice: Subject to any disclaimer, the term of this patent is extended or adjusted under 35 U.S.C. 154(b) by 389 days.

(21) Appl. No.: 15/997,098

(22) Filed: Jun. 4, 2018

(65) Prior Publication Data

US 2019/0368536 A1    Dec. 5, 2019

(51) Int. Cl.
*F16C 11/06* (2006.01)
*F16J 3/04* (2006.01)

(52) U.S. Cl.
CPC .......... *F16C 11/0671* (2013.01); *F16J 3/042* (2013.01); *Y10T 403/315* (2015.01); *Y10T 403/32729* (2015.01)

(58) Field of Classification Search
CPC . F16C 11/069; F16C 11/0671; F16C 11/0666; F16C 11/0676; F16J 3/042; F16J 3/048; F16J 3/041; Y10T 403/32727; Y10T 403/32729; Y10T 403/31; Y10T 403/315; Y10T 403/32737; F16D 2003/22316
USPC .......................... 403/134; 464/173, 174, 175
See application file for complete search history.

(56) References Cited

U.S. PATENT DOCUMENTS

| | | | | |
|---|---|---|---|---|
| 3,248,955 A | * | 5/1966 | Templeton | F16C 11/0671 403/50 |
| 3,403,932 A | * | 10/1968 | Kutcher | F16C 11/06 403/51 |
| 5,066,159 A | * | 11/1991 | Urbach | F16C 11/0666 403/134 |
| 5,267,805 A | * | 12/1993 | Ueno | F16C 11/0657 403/132 |
| 5,380,114 A | * | 1/1995 | Urbach | F16C 11/06 403/134 |
| 5,649,779 A | * | 7/1997 | Martin | F16C 11/0671 277/635 |
| 5,653,545 A | * | 8/1997 | Moormann | F16C 11/0671 403/50 |
| 5,782,573 A | * | 7/1998 | Dorr | F16C 11/0657 403/135 |
| 6,042,294 A | * | 3/2000 | Urbach | B60G 3/20 403/135 |

(Continued)

*Primary Examiner* — Amber R Anderson
*Assistant Examiner* — Kevin J Baynes
(74) *Attorney, Agent, or Firm* — Finch & Maloney, PLLC; Michael J. Bujold

(57) ABSTRACT

A ball joint having a ball stud that has a joint ball fixed at one end; a housing that defines a longitudinal axis and has an interior area which receives the joint ball and a socket that is positioned between the housing and the joint ball. The housing has an open end that includes an opening through which the ball stud extends when the joint ball is received within the interior area of the housing. The open end of the housing is formed such that the opening has a diameter that is smaller than a diameter of the joint ball. A press-on ring engages with an outer surface of the housing at the open end so as to increase a pull-out performance of the ball joint.

12 Claims, 3 Drawing Sheets

(56) References Cited

U.S. PATENT DOCUMENTS

| | | | | |
|---|---|---|---|---|
| 6,530,711 B2* | 3/2003 | Menotti | ............... | F16C 11/0671 |
| | | | | 277/635 |
| 6,648,340 B2* | 11/2003 | Yagyu | ....................... | F16J 3/042 |
| | | | | 277/634 |
| 6,962,351 B2* | 11/2005 | De Freitas | .......... | F16C 11/0671 |
| | | | | 277/634 |
| 7,862,250 B2* | 1/2011 | Kuru | ................... | F16C 11/0671 |
| | | | | 403/134 |
| 2010/0025950 A1* | 2/2010 | Budde | ....................... | F16J 3/042 |
| | | | | 280/93.511 |
| 2016/0025129 A1* | 1/2016 | Parker | ................ | F16C 11/0671 |
| | | | | 403/134 |

* cited by examiner

PRESS-ON RING FOR IMPROVING PULL-OUT PERFORMANCE IN NON-FERROUS JOINT OR CONNECTION APPLICATIONS

FIELD OF THE INVENTION

The present invention relates to a press-on ring for improving pull-out performance in joint or connection applications in which the structural member is of a weaker material than the press-on ring.

BACKGROUND OF THE INVENTION

Ball joints are known in the automobile industry for connecting different components to each other in such a manner that one component can rotate and pivot with respect to a second component. Conventional radial type ball joints are provided with a housing which can be integrally formed with or connected to one of the components while a ball stud is coupled to the other of the components. In producing or assembling the radial ball joint, a ball stud is inserted into an inlet side or end of a housing until a joint ball of the ball stud is received within a bearing socket which is accommodated within an interior of the housing. The bearing socket rotatably and tiltably accommodates the joint ball of the ball stud within the interior of the housing such that a stud of the ball stud projects through an outlet opening on the opposite side or end of the housing. The inlet side of the housing is closed with a cover. To secure the cover on the inlet side of the housing, a rim around the opening in the inlet side is rolled, pressed or bent over the perimeter of the cover. As a result of this the bearing socket is fixed within the housing. The bearing socket has a spherical surface which mates with the outer surface of the joint ball such that the joint ball is generally fixed in position within the housing. Adjacent the outlet opening, the interior surface of the housing is sloped radially toward the longitudinal axis such that the outlet opening is generally smaller than the size of the joint ball. Due to the cover fixed at the inlet side and the smaller size of the outlet opening the bearing shell is secured in position while the joint ball is likewise fixed in position by the by the bearing shell. In this arrangement the ball stud is able to rotate and pivot with respect to the housing.

Ball joint applications are known in which components of the ball joints are manufactured from materials having different properties or characteristics in an attempt to reduce the weight and/or costs associated with manufacturing a ball joint. Although ball joints manufactured from different materials may be beneficial in some aspects there are often times drawbacks associated with ball joint components made from different materials. For example, a ball joint component made from a material that is lightweight and/or more easily machined may be more likely to fail and/or wear at a faster rate than the same component made from a heavier and/or more durable material.

SUMMARY OF THE INVENTION

Wherefore, it is an object of the present invention to overcome the above mentioned shortcomings and drawbacks associated with the prior art.

Another object of the invention is to provide a ball joint comprising structural members made from materials having different properties or characteristics which are beneficial for reducing the weight and/or costs associated with manufacturing such a ball joint while at the same time reducing the likelihood of failure and the rate at which the structural member wears.

A further object of the invention is to provide a ball joint having a structural feature such as a housing made from a material, such as a non-ferrous material, that is comparatively lightweight and easily machined and employ a component to offset the drawbacks often associated with ball joint structural features produced from lightweight, non-ferrous materials.

Yet another object of the invention is to provide a press-on ring which can be positioned at the outlet opening of a ball joint housing through which the stud of the ball stud extends, to reinforce the open end of the housing and thereby reduce failure of the housing, specifically the occurrence ball stud "pull-out." That is say in other words, to provide a press-on ring that improves the pull-out performance of the ball joint by increasing the amount of tensile stress placed on the ball joint before the open end of the housing fails and the ball stud pulls out of the housing.

A still further object of the invention is to provide a ball joint for vehicle components, such as control arms and tie rods in which the ball joint housing is formed from a non-ferrous material. The ball joint comprising a press-on ring that has a relatively higher modulus of elasticity or is made from a material having a modulus of elasticity that is higher in comparison to the non-ferrous housing or the non-ferrous material used to form the housing. The press-on ring being mounted around a collar at the outlet opening of the housing in such a manner that it strengthens, reinforces or rather braces the collar of the housing, thereby enhancing, increasing or improving the pull-out performance of the housing and thus the pull out performance of the control arms, tie rods, or ball joints.

Yet another object of the invention is to provide a press-on ring for housings of nonferrous components, which meet all of the requirements, such as oscillating angle and load bearing ability, for a housing of such a ball joint, while at the same time meeting a high pull-out requirement for safety.

A still further object of the present invention is to provide a ball joint having a housing comprising a press-on ring that facilitates coupling a sealing bellows to the housing for sealing the open end of the housing from outside elements such as dirt, sand, debris, water and other foreign matter. For example such a press-on ring could be mold-bonded to a sealing boot or bellows.

Ball joint components made of non-ferrous materials are characterized both as being softer and by their comparatively, low tensile strength, durability and relative poor ability to resist physical changes when acted upon by an external force or stress and thus their rate of failure and wear are relatively high. As used herein, the term "non-ferrous" generally refer to materials that have a relatively low modulus of elasticity, a low Young's modulus and/or a low tensile strength in comparison to ferrous materials, e.g., ferrous metals such as steel and iron which are know for their high tensile strength and durability, i.e., superior ability to resist physical changes when acted upon by an external force or stress. In other words, the term non-ferrous materials generally refers to materials that are prone to elastic and plastic deformation, fatigue, stress and strain, in the present case, non-ferrous materials or materials having a relatively low elastic modulus are utilized for making components of control arms, tie rods, and/or ball joints as described below.

The present invention also relates to a ball joint comprising: a ball stud that has a joint ball fixed at one end thereof; a housing that defines a longitudinal axis and has an interior area for receiving the joint ball and a socket that is positioned between the housing and the joint ball. The housing has opposed first and second open ends, the first open end having a diameter larger than the joint ball to facilitate receiving the ball joint and the socket while the second open end having a diameter smaller than the joint ball to facilitate retaining the joint ball within the housing but larger than the ball stud to facilitate passage of the ball stud therethrough, when the joint ball is received within the interior area of the housing. An outer annular surface surrounds the second open end of the housing; and a press-on ring engages with the outer annular surface of the housing to reinforce the second open end and resist enlargement of the diameter of the second open end and thereby increase a pull-out performance of the ball joint.

The present invention further relates to a ball joint that comprises a ball stud having a joint ball fixed at one end thereof, and a housing that defines a longitudinal axis and has an interior area which receives the joint ball of the ball stud and a socket that is positioned between and mates with an inner surface of the housing and an outer surface of the joint ball so as to rotatably and pivotally fix the joint ball within the interior area of the housing. The housing has an open end that comprises an opening through which the ball stud extends when the joint ball is received within the interior area of the housing. The opening in the open end of the housing extends laterally with respect to the longitudinal axis and has a diameter that is smaller than a diameter of the joint ball such that the socket and the joint ball are captively retained within the interior area of the housing. The open end of the housing forms an axially extending neck. A press-on ring radially surrounds and mates with an outer surface of the neck. The housing is formed from a first material and the press-on ring is formed from a second material such that the press-on ring has a relatively higher modulus of elasticity in comparison with a modulus of elasticity of the housing so as to increase an amount of tensile stress placed on the ball joint between the ball stud and the housing before the joint ball is pulled-out of the interior area of the housing.

BRIEF DESCRIPTION OF THE DRAWINGS

The accompanying drawings, which are incorporated in and constitute a part of the specification, illustrate various embodiments of the invention and together with the general description of the invention given above and the detailed description of the drawings given below, serve to explain the principles of the invention. The invention will now be described, by way of example, with reference to the accompanying drawings in which.

It should be understood that the drawings are not necessarily to scale and that the disclosed embodiments are sometimes illustrated diagrammatical and in partial views. It should be further understood that sectional lines in the sectional views do not necessarily represent specific materials of the different components but merely illustrate and distinguish the different components. In certain instances, details which are not necessary for an understanding of this disclosure or which render other details difficult to perceive may have been omitted. It should be understood, of course, that this disclosure is not limited to the particular embodiments illustrated herein.

DETAILED DESCRIPTION OF THE PREFERRED EMBODIMENTS

Figure 1:
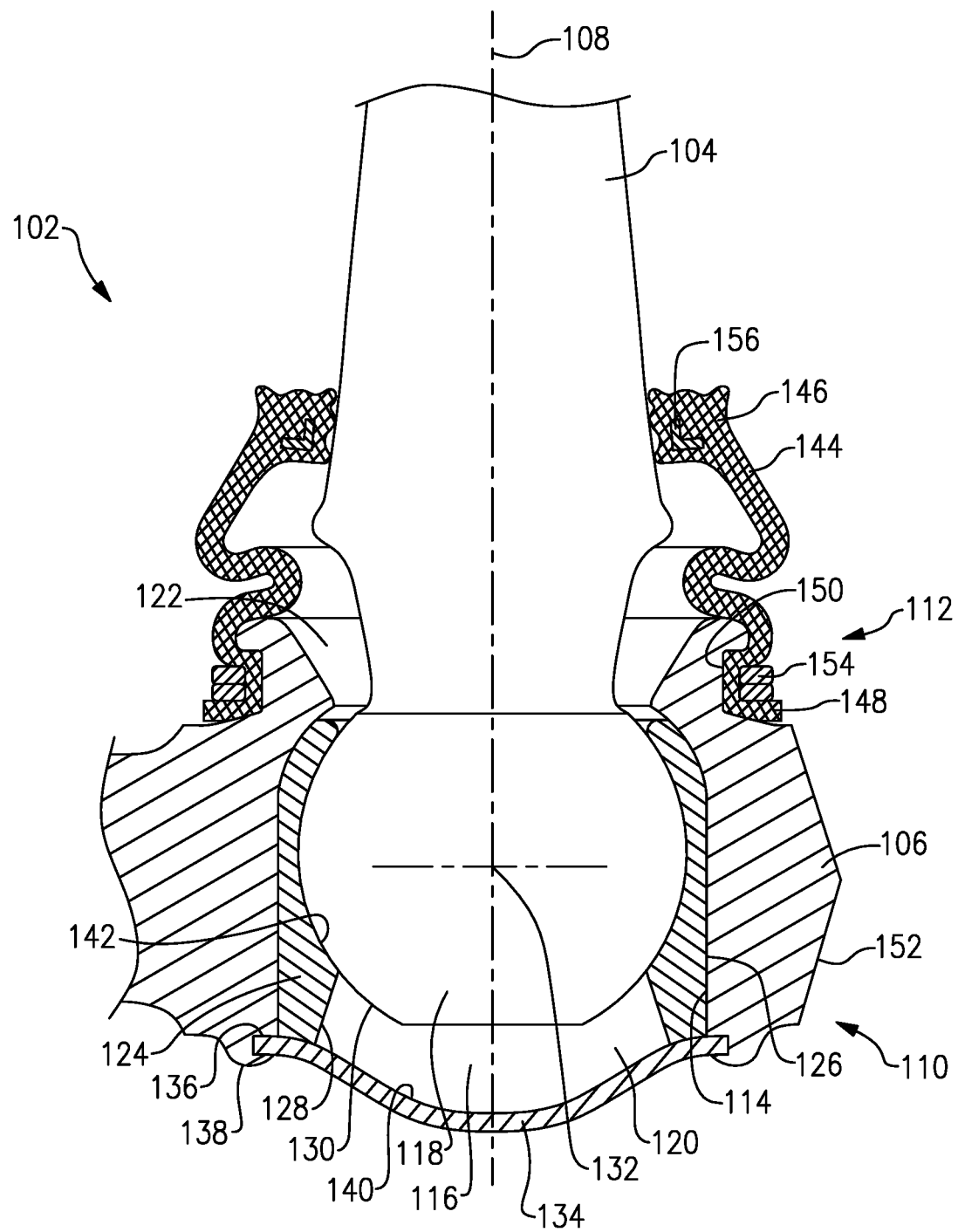
FIG. 1 is a conventional ball joint known from the prior art.

The present invention will be understood by reference to the following detailed description, which should be read in conjunction with the appended drawings. It is to be appreciated that the following detailed description of various embodiments is by way of example only and is not meant to limit, in any way, the scope of the present invention, FIG. 1 shows a radial ball joint 102 known from the prior art, which comprises a ball stud 104 and a housing 106 arranged in an assembled state. The radial ball joint 102 will be described below with reference to the basic process by which it is assembled. The housings 106 of the radial type ball joints are generally cylindrical, define a longitudinal axis 108 and have axially opposite inlet and outlet ends 110, 112. An inner surface 114 of the housing 106 defines an interior area 116 in which a joint ball 118 of the ball stud 104 is to be mounted. The inner surface 114 defines an inlet opening 120 at the inlet end 110 of the housing 106 and an outlet opening 122 at the outlet end 112 of the housing 106. The inner surface 114 axially extends and is generally cylindrical along the inlet end 110 of the housing 106. Towards the outlet end 112 of the housing 106, the inner surface 114 curves radially inward toward the axis 108 such that the outlet opening 122 has a diameter that is smaller then a diameter of the inlet opening 120. A bearing socket 124 is mounted on the joint ball 118 and the ball stud 104 is passed through the inlet opening 120 and out through the outlet opening 122 of the housing 106 until the joint ball 118 and bearing socket 124 are introduced through the inlet opening 120 into the interior area 116 of the housing 106. As the ball stud 104 is axially pulled through the housing 106, an exterior surface 126 of the bearing socket 124 slides along the inner surface 114 until further movement of the ball stud 104 through the housing 106 is prevented by means of the inwardly curved inner surface 114 at the outlet end 112 of the housing 106. That is to say in other words the joint ball 118 and bearing socket 124 axially pass through the interior area 116 of the housing 106 until the end of the bearing socket 124 becomes sufficiently compressed between the joint ball 118 and the inner surface 114 of the housing 106 at the outlet end 112 thereof. The exterior surface 126 of the bearing socket 124 mates with the inner surface 114 of the housing 106 and the interior surface 128 of the bearing socket 124 mates with the outer surface 130 of the joint ball 118 such that the joint ball 118 is rotatably and pivotally supported within the housing 106. Due to the inwardly curved inner surface 114 at the outlet end 112 of the housing 106 together with the bearing socket 124, the joint ball 118, i.e., a center point 132 of the joint ball 118 is fixed laterally, however only fixed in one axial direction. When movement of the ball stud 104 through the housing 106 is stopped, the joint ball 118 is fully received within the interior area 116 of the housing 106 with the ball stud 104 extending from the housing 106 through the outlet opening 122 in the outlet end 112 thereof. To axially secure the joint ball 118 within the housing 106 in both axial directions, a cover 134 is introduced into the interior area 116 of the housing 106 until it abuts a stop 136 in the inlet end 110 of the housing 106 adjacent the inlet opening 120. Once the cover 134 is positioned against the stop 136, a rim 138 of the housing 106 is deformed, pressed, rolled, bent or otherwise machined radially inward over the perimeter of the cover 134 thereby securing it in position. As shown in FIG. 1, the inside surface 140 of the cover 134 contacts the end of the bearing socket 124 that is adjacent the inlet end 110 of the housing 106 such that the axial position of the bearing socket 124 becomes fixed. The interior surface 128 of the bearing socket 124 comprises a spherical surface 142 which mates with the outer surface 130 of the joint ball 118 such that the joint ball 118 is generally fixed in position within the housing 106. Because the bearing socket 124 is fixed in position between the cover 134 and the smaller diameter outlet opening 122 and due to the corresponding spherical shapes of the spherical surface 142 of the bearing socket 124 and the outer surface 130 of the joint ball 118, the joint ball 118 is fixed in both axial directions within the interior area 116 of the housing 106.

As shown, the radial ball joint 102 has a sealing boot or rather a sealing bellows 144 which are known to protect ball joints or more specifically the interior areas 116 of ball joint housings 106 from damage or contamination by outside elements such as dirt, sand, debris, water and other foreign matter, which can otherwise enter into the interior area 116 of the housing 106 through the outlet opening 122. The sealing bellows 144 is a flexible sheath having a remote end 146 that is secured to the ball stud 104 and an opposite proximate end 148 thereof secured to the housing 106. Attaching a sealing bellows 144 to the ball joint 102 in this manner encloses the outlet end 112 of the housing 106 thereby preventing outside elements from entering into the interior area 116 of the housing 106 through the outlet opening 122 while at the same time allowing the ball stud 104 and the housing 106 to move relative to each other. As can be seen in FIG. 1, the proximate end 148 of the sealing bellows 144 is received within an annular groove 150 in the outer surface 152 of the housing 106 at the outlet end 112 thereof. To help maintain engagement of the sealing bellows 144 with the housing 106, i.e., to help secure the proximate end 148 of the sealing bellows 144 within the annular groove 150, it is common to position a retaining ring 154 on the outer surface of the sealing bellows 144. It is also known for the remote end 146 of the sealing bellows 144 to comprise a retaining ring 156 that is molded within the material of the sealing bellows 144. These retaining rings 154, 156 can be for example mold-bonded steel components such as J-rings or solid end rings which merely function to help retain the sealing bellows 144 against the surface of the ball stud 104. Retaining rings 148 that help fasten the proximate end 148 of the sealing bellows 144 within the annular groove 150 are generally split rings such that they can readily be expanded for installation about the circumference of the sealing bellows 144.

As indicated above, radial ball joints are known which comprise a component, e.g., socket housing, that is made a lightweight material. Forming ball joint from such materials may be beneficial in some aspects however they may at the same time introduce unintended drawbacks. For example, a ball joint component made from a material that is lightweight and/or more easily machined may be easier and less expensive to produce however a component made from a lightweight material may be more likely to fail and/or wear at a faster rate than the same component made from a heavier and/or more durable material. The invention will be described using phraseology and/or terminology which are merely intended to distinguish different components or like components by the materials from which they were formed or manufactures, or more specifically distinguish different components or like components by the noted quality, characteristics and/or properties of the materials from which they were made. For example, a first component may be described as being "lightweight," "weak," "soft," "malleable," or "pliant" while in comparison a second component may be described as being "strong," "hard," "inflexible," " or "rigid." Such terminology is meant to be understood as a description of a certain quality, characteristic and/or property of the first and the second components, i.e., the material from which first and the second components were made, relative to each other. In what follows the qualities, characteristics and/or properties generally referred to correspond to the components tensile strength, modulus of elasticity (elastic modulus), Young's modulus, and/or bending stiffness. It is also to be understood that terms such as "non-ferrous" and "ferrous" are not specifically directed toward the chemical make up, i.e., the presence or the lack of Iron in the material forming the specified component, but can relate to the characteristics commonly associated with non-ferrous and ferrous materials or components formed from non-ferrous and ferrous materials. For example, ferrous materials such as alloy steel, carbon steel, cast iron and wrought iron are known for their high tensile strength and durability, whereas non-ferrous materials such as aluminum, copper, lead, zinc, tin, gold and silver are known for their malleability.

In view of the above, ball joints having housings that are made from a weaker material relative to ball joints having housings made from a stronger material, i.e., a material having a relatively low modulus of elasticity or a low tensile strength, are more likely to fail when a tensile stress is placed thereon. With regards to ball joints, tensile stress customarily refers to stress placed on the ball joint in opposite directions along the longitudinal axis, i.e., stress placed on the ball joint when the ball stud is pulled axially away from the direction in which the housing is being pulled. Generally such a tensile stress placed on a ball joint becomes focused or directed on the outlet opening of the housing by means of the joint ball via the bearing socket. More specifically, from the perspective shown in FIG. 1, when an "upwardly" directed force is placed on the ball stud 104 in an axial direction away from the housing 106, the outer margin of the joint ball 118 directs an upward force on the end of the bearing socket 124 which in turn directs an upward force on the outlet end 112 of the housing 106. When ball joint housings are made from a softer or non-ferrous material, due to its relatively low elastic modulus or tensile strength, the outlet end 112 of the housing 106 can be relatively easily deformed by the tensile stress placed thereon. If the tensile stress is great enough, the outlet end 112 of the housing 106 can bend open, i.e., bend upward and/or outward enabling the joint ball 118 to "pull-out" of the housing 106 through the enlarged outlet opening 122. In the industry, the term "pull-out performance" of a ball joint generally refers to the amount of tensile stress that can be placed on the ball joint before the housing 106, i.e., the outlet end 112 of the housing 106, fails and the joint ball 118 is pulled out through the outlet opening 122. As should be understood, the greater the amount of tensile stress that can be placed on the ball joint before the ball joint fails, the higher the pull-out performance of the ball-joint. The pull-out performance of ball joints will be discussed in more detail below.

Figure 2:
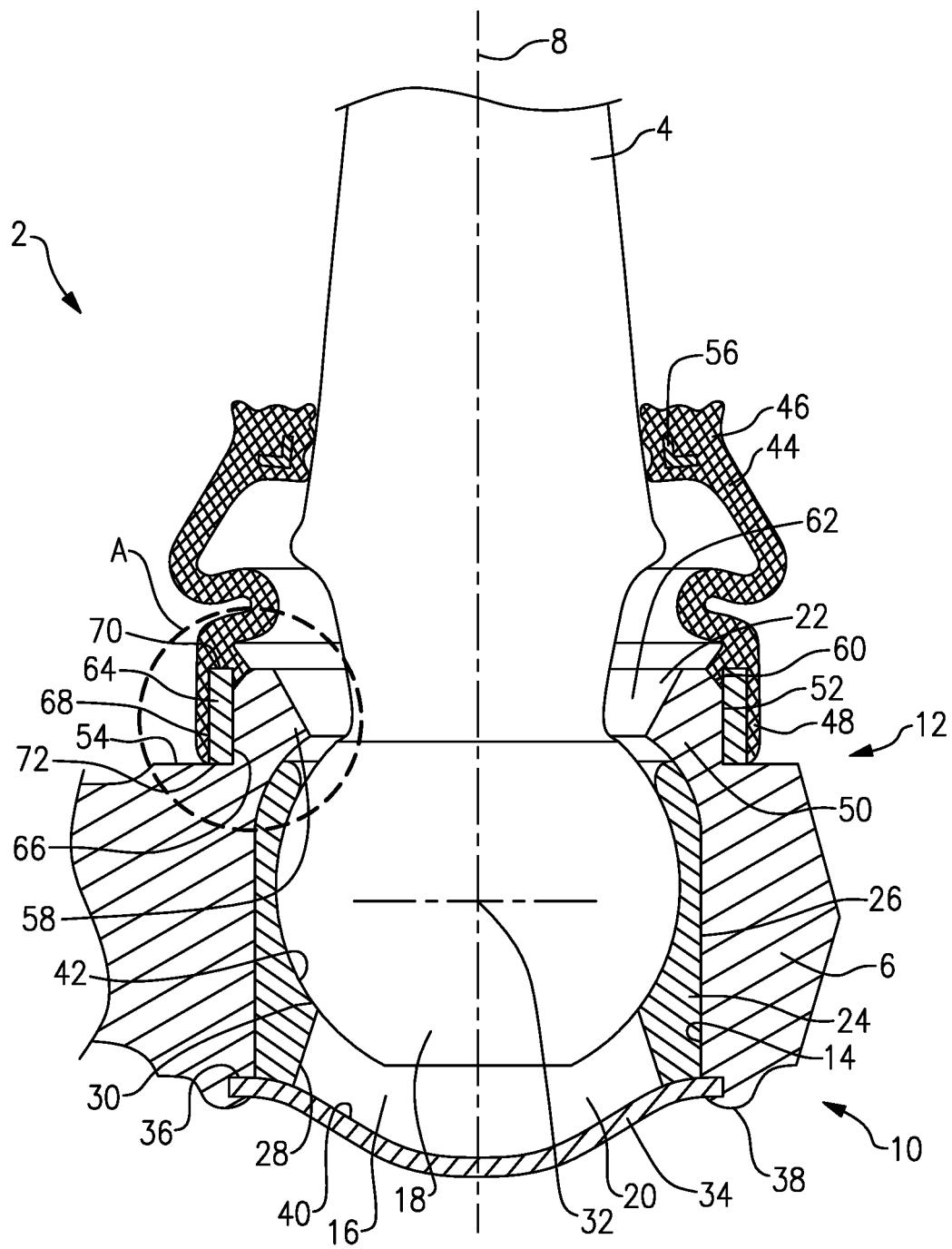
FIG. 2 is a sectional view of a ball joint according to the invention including a press-on ring.

Turning now to FIG. 2, an embodiment of the present invention will now be described. FIG. 2 shows a sectional view of a ball joint 2 according to the present invention in an assembled state, i.e., with a joint ball 18 of a ball stud 4 accommodated in an interior area 16 of the housing 6 together with a bearing socket 24 surrounding the joint ball 18. In assembling of the ball joint 2 the bearing socket 24 is mounted on the joint ball 18 and the ball stud 4 is passed through an inlet opening 20 and out through the outlet opening 22 of the housing 6 until the joint ball 18 and bearing socket 24 are introduced through the inlet opening 20 into the interior area 16 of the housing 6. As the ball stud 4 is axially pulled through the housing 6, an exterior surface 26 of the bearing socket 24 slides along the inner surface 14 of the housing 6 until further movement of the ball stud 4 through the housing 6 is prevented by means of the inwardly curved inner surface 14 at the outlet end 12 of the housing 6. That is to say in other words the joint ball 18 and bearing socket 24 axially pass through the interior area 16 of the housing 6 until the end of the bearing socket 24 becomes compressed between the joint ball 18 and the inner surface 14 of the housing 6 at the outlet end 12 thereof. The exterior surface 26 of the bearing socket 24 mates with the inner surface 14 of the housing 6 and the interior surface 28 of the bearing socket 24 mates with the outer surface 30 of the joint ball 18 such that the joint ball 18 is rotatably and pivotally supported within the housing 6. Due to the inwardly curved inner surface 14 at the outlet end 12 of the housing 6 together with the bearing socket 24, the joint ball 18, i.e., a center point 32 of the joint ball 18 is fixed laterally on the longitudinal axis 8, however it is only fixed in one axial direction. At this point, the joint ball 18 is fully received within the interior area 16 of the housing 6 with the ball stud 4 extending from the housing 6 through the outlet opening 22 in the outlet end 12 thereof. To axially secure the joint ball 18 within the housing 6 in both axial directions, a cover 34 is introduced into the interior area 16 of the housing 6 until it abuts a stop 36 in the inlet end 10 of the housing 6 adjacent the inlet opening 20. Once the cover 34 is positioned against the stop 36, a rim 38 at the inlet end 10 of the housing 6 is deformed, pressed, rolled, bent or otherwise machined radially inward over the perimeter of the cover 34 thereby securing the cover 34 in position. As shown in FIG. 2, an inside surface 40 of the cover 34 contacts the end of the bearing socket 24 that is adjacent the inlet end 10 of the housing 6 such that the axial position of the bearing socket 24 becomes fixed. The interior surface 28 of the bearing socket 24 comprises a spherical surface 42 which mates with the outer surface 30 of the joint ball 18 such that the joint ball 18 is generally fixed in position within the housing 6. Because the bearing socket 24 is fixed in position between the cover 34 and the smaller diameter outlet opening 22 and due to the corresponding spherical shapes of the spherical surface 42 of the bearing socket 24 and the outer surface 30 of the joint ball 18, the joint ball 18 is fixed in both axial directions within the interior area 16 of the housing 6.

The outlet end 12 of the housing 6 comprises a neck 50 having an inwardly extending annular shoulder 58 which defines the outlet opening 22. The neck 50 is formed to have a radially outer surface 52 that is at least substantially cylindrical and axially extends upward from a lateral surface 54 of the housing 6. At remote end of the neck 50, opposite from the lateral surface 54, the outer surface 52 of the neck 50 may have a chamfered surface 60 which is angled radially inward from the axially extending outer surface 52. From the outlet end 12 of the housing 6, an upper surface 62 of the shoulder 58 is angled radially inward and axially toward the joint ball 18. The inwardly curved inner surface 14 of the housing 6 meets the upper surface 62 of the shoulder 58 and forms an edge therewith that delimits the outlet opening 22 of the housing 6. The outlet opening 22 of the housing 6, through which the ball stud 4 extends, has a diameter that is smaller than the greatest diameter of the joint ball 18. In this manner, the shoulder 58 in the neck 50 of the housing 6 fixes the axial position of the joint ball 18 in the interior area 16 of the housing $ such that the joint ball 18 can rotate and pivot with respect to the housing 6 while the center point 32 of the joint ball 18 remains fixed.

The ball joint 2 as illustrated in FIG. 2 can comprise a housing 6 that is made from a softer or non-ferrous material, i.e., a material having a relatively low elastic modulus or tensile strength, so as to benefit from the advantageous characteristics and/or properties associated with such materials. That is to say, the housing 6 can be made from a material that is relatively easy to stamp, deform, press, roll, machine or otherwise manipulate thereby reducing the effort, energy and components needed for bending the rim 38 over the perimeter of the cover 34 thereby fixing the joint ball 18 within the interior area 16 of the housing 6. Generally the housing 6 of the inventive ball joint 2 is made from a ferrous or non-ferrous material including cast iron or metals, such as aluminum, aluminum alloys, copper, lead, zinc, tin and can also include ceramic, fibrous, and plastic or polymeric materials. It is preferable to form the housing 6 from a material that has a relatively low tensile strength of between about 75 MPa to 425 MPa, or more preferably a tensile strength of about 250 MPa. The elastic modulus of the material forming the housing 6 is low preferably between about 50 GPa to 110 GPa, or more preferably the elastic modulus of the material is about 70 GPa.

As noted above, the use of housings in ball joints that are formed from relatively lightweight, weak, soft, malleable, or pliant materials or ferrous or non-ferrous materials that have relatively low tensile strength or elastic modulus, may be beneficial for some purposes however ball joint housings made from such materials have a correspondingly low pull-out performance. In other words, in ball joints with housings made from these materials that have a relatively low tensile strength or low elastic modulus, the amount of tensile stress placed on the ball joint before the housing fails and the joint ball is pulled out through the outlet opening, is relatively low in comparison to ball joints having housings formed from materials having a relatively higher tensile strength or elastic modulus for example. To avoid reduction of the pull-out performance of the ball joint housings made from such a material, the ball joint 2 according to the invention comprises an annular press-on ring 64 that is mounted about the outer surface 52 of the neck 50.

The press-on ring will now be discussed with reference to the variations illustrated FIGS. 2-4. The press-on ring is made from a material having a relatively higher modulus of elasticity, Young's modulus, and/or tensile strength than that of the housing or rather non-ferrous component. It is to be appreciated that the press-on ring can be made from a material such as ferrous metals, like steel and/or iron or any other material as long as the material forming the press-on ring has a higher modulus of elasticity or rather tensile strength in comparison to the material forming the housing. For purposes of comparison to the housing as described above, the press-on ring according to the invention is made from a material that has tensile strength of preferably between about 400 MPa to 2700 MPa, or more preferably a tensile strength of about 590 MPa. The modulus of elasticity of the material forming the press-on ring is preferably between about 140 GPa to 240 GPa, or more preferably a modulus of elasticity of about 200 GPa.

The press-on ring 64 shown in FIG. 2 is pressed-onto the neck 50 of the housing 6 so as to increase the pull-out performance of the housing 6 and thus the ball joint 2. That is to say in other words, the press-on ring 64 functions to strengthen, reinforce or rather brace the neck 50 of the housing 6, thereby increasing the amount of tensile stress that can be placed on the ball joint 2 before the shoulder 58 and/or the neck 50 of the housing 6 fails and the joint ball 18 is pulled out through the outlet opening 22. The diameter of the outer surface 52 of the neck 50 closely corresponds to a diameter of an interior surface 66 of the press-on ring 64 such that the interior surface 66 of the press-on ring 64 directly mates with the outer surface 52 of the neck 50 and a close fit, friction fit, press fit, or an interference fit is formed therebetween. The chamfered surface 60 of the neck 50 facilitates centering and mounting of the press-on ring 64 on the neck 50 of the housing 6. In the variation of the press-on ring 64 illustrated in FIG. 2, the press-on ring 64 is cylindrical and has the interior surface 66 and an exterior surface 68, which in cross-section can be parallel to each other. The press-on ring 64 further has axially upper and lower end surfaces 70, 72 that can also be parallel to each other. The press-on ring 64 has an axial length, which is defined as the distance from the upper end surface 70 to the lower end surface 72, that is at least as long as the axial length of the neck 50 of the housing 6 which is defined as the axial distance from the lateral surface 54 to the axial end surface at the outlet end 12 of the housing 6. The interior surface 66 of the press-on ring 64 mates with an entirety of the cylindrical outer surface 52 of the neck 50 of the housing 6. Due to the direct contact between the press-on ring 64 and the neck 50, the press-on ring 64 functions to counter or withstand tensile stress or force placed on the ball joint 2. In this way the press-on ring 64 strengthens, reinforces or rather braces the neck 50 of the housing 6 so as to increase the pull-out performance of the housing 6, i.e., increase the amount of tensile force placed on the ball joint 2 before the ball stud 4 is pulled-out of the housing 6.

Figure 3:
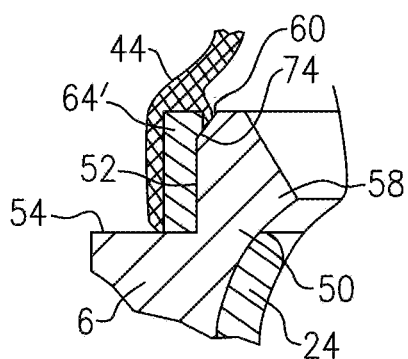
FIG. 3 is an enlarged view of an area marked A in FIG. 2 showing a variation of the press-on ring.
Figure 4:
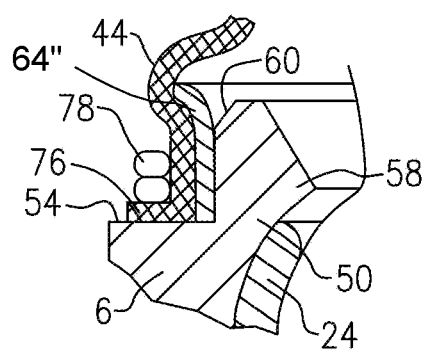
FIG. 4 is an enlarged view of the area marked A in FIG. 2 showing another variation of the press-on ring.

FIG. 2 shows an area A encircled by a dashed line which corresponds the enlarged portions of the ball joint 2 illustrated in FIGS. 3 and 4 which show variations of the press-on ring 64. The variation of the press-on ring 64' illustrated in FIG. 3 is similar to that shown in FIG. 2 except that in this variation, the interior surface 66 of the press-on ring 64' has a beveled surface 74 that is angled radially inward and located at the upper end of the press-on ring 64'. As is plain to see, the beveled surface 74 of the press-on ring 64' mates with the chamfered surface 60 of the neck 50. As such, the axial length of the press-on ring 64 mates with an entirety of the axial length of the neck 50 of the housing 6 including the chamfered surface 60 thereby maximizing the direct contact between the press-on ring 64' and the neck 50. The material thickness of the press-on ring 64, 64', 64", i.e., the dimension between the interior and exterior surfaces 66, 68 of the press-on ring 64, 64', 64" can vary from application to application based on the required pull-out performance of the ball joint 2 as well as other factors such as weight and costs associated with such press-on rings. It should be understood that, press-on rings having a greater material thickness may increase the pull-out performance of the ball joint however the weight and costs associated with a thicker press-on ring would likely increase as well. FIG. 4 shows another variation of the press-on ring 64" which has a smaller material thickness, i.e., is thinner, and has a greater axial length in comparison to the variations of the press-on rings 64, 64' shown in FIGS. 2 and 3. The press-on ring 64" extends axially beyond the outlet end 12 of the neck 50 and the upper end of the press-on ring 64" is curved radially outward. Along with the size of the press-on ring, it is to be appreciated that the press-on ring can be of any shape, i.e., can have any cross sectional profile. However an important aspect of the press-on ring is that it directly mates with the outer surface 52 of the neck 50 about the circumference of the neck 50 so as to form strong interference fit therewith and to increase the pull-out performance of the ball joint 2. In each one of the variations of the press-on ring 64, 64', 64" as shown in FIGS. 2-4, the lower end surface 72 of the press-on ring 64, 64', 64" mates with the lateral surface 54 of the housing 6 such that, in each case, the press-on ring 64, 64', 64" mates at least with the laterally directed surface 54 of the housing 6 as well as the axially directed outer surface 52 of the neck 50. Not only does the direct contact between the press-on ring 64, 64', 64" and the housing 6 enhance the interference fit and the pull-out performance, these mating surfaces 52, 66 form a seal between the press-on ring 64, 64', 64" and the housing 6. For this purpose it is preferable for the press-on ring 64, 64', 64" to be plated so as to enhance communication between the mating surfaces 52, 66 and 54, 72 of the housing 6 and the press-on ring 64, 64', 64". For example the press-on ring 64, 64', 64" can be plated with zinc and/or nickel. Plating of the press-on ring 64, 64', 64" can also help to prevent galvanic corrosion between the press-on ring 64, 64', 64" and the housing 6 depending on the materials used to form these components.

The ball joint 2 can include a sealing bellows 44 which helps to seal the outlet opening 22 of the housing 6 and prevent outside elements such as dirt, sand, debris, water and other foreign matter from accessing the interior area 16 of the housing 6. FIG. 2 shows a remote end 46 of the sealing bellows 44 being secured to the outer surface of the ball stud 4 by means of a retaining ring 56. The opposite proximate end 48 of the sealing bellows 44 can be connected, mold-bonded, or materially bonded to the press-on ring 64, which directly mates with the outer surface 52 of the neck 50 of the housing 6 thereby preventing contaminants from accessing the outlet opening 22 of the housing 6. In the variation of the press-on ring 64 shown in FIG. 2, the proximate end 48 of the sealing bellows 44 is bonded to the entire exterior surface 68 and upper end surface 70 of the press-on ring 64 as well as the upper end of the interior surface 66 of the press-on ring 64. The proximate end 48 of the sealing bellows 44 also mates with the chamfered surface 60 of the housing 6. According to the variation of the press-on ring 64' illustrated in FIG. 3, the proximate end 48 of the sealing bellows 44 is bonded along the entire exterior surface 68 as well as the upper end surface 70 of the press-on ring 64'. In the case of the sealing bellows 44 as shown in FIG. 4, the proximate end 48 of the sealing bellows 44 has a flange 76 which extends laterally outward from the press-on ring 64" and mates with the lateral surface 54 of the housing 6. The upper end of the press-on ring 64" is flared radially outward such that the combination of the press-on ring 64" and the lateral surface 54 of the housing 6 form an outer annular channel which receives the proximate end 48 of the sealing bellows 44. To secure the proximate end 48 of the sealing bellows 44 within the annular channel, one or more retaining rings 78 can be arranged about the circumference of the sealing bellows 44. In each of the three variations of the press-on ring 64, 64', 64" as shown in FIGS. 2-4, the proximate end 48 of the sealing bellows 44 covers the entire exterior surface 68 of the press-on ring 64, 64', 64" or in other words the entire axial extent of the press-on ring 64, 64', 64" is covered by the sealing bellows 44. It should be recognized that the sealing bellows 44 can be of any shape and/or size so long as the sealing bellows 44 and the press-on ring seal the outlet opening 22 of the housing 6 from the outside elements. In addition to the seal formed by the mating surfaces of the neck 50 and the press-on ring, the sealing bellows 44 can also contact surfaces of the housing 6 so as to further enhance the seal. It is also to be appreciated that the sealing bellows 44 can have any overall geometry as long as the sealing bellows 44 does not restrict rotational and pivotal movement of the ball stud 4 relative to the housing 6.

Figure 5A:
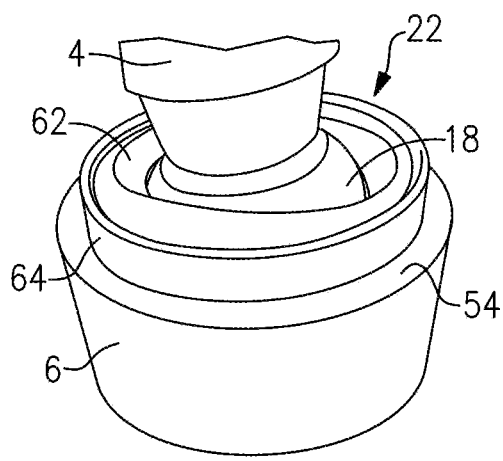
FIG. 5A is a pictorial view of the ball joint according to the invention prior to a pull-out performance test.
Figure 5B:
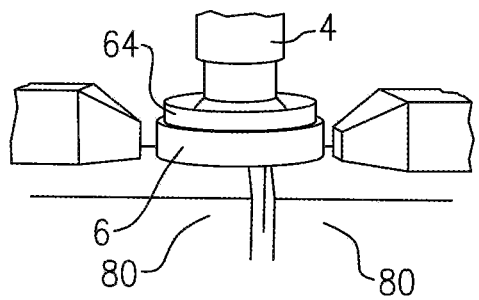
FIG. 5B is a plan view of the ball joint shown in FIG. 5A prior to the pull-out performance test.
Figure 6A:
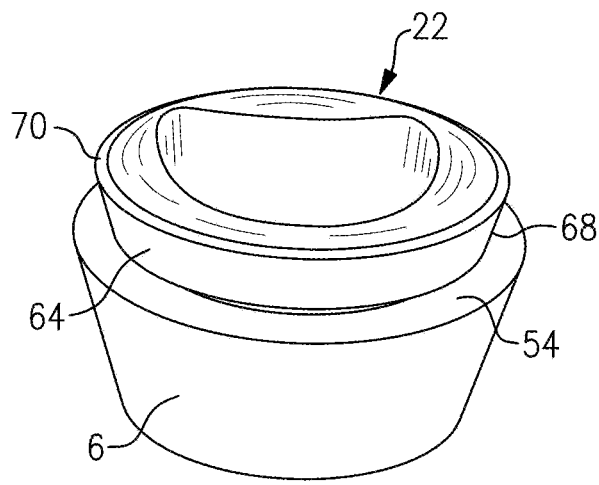
FIG. 6A is a pictorial view of the ball joint shown in FIG. 5A following the pull-out performance test.
Figure 6B:
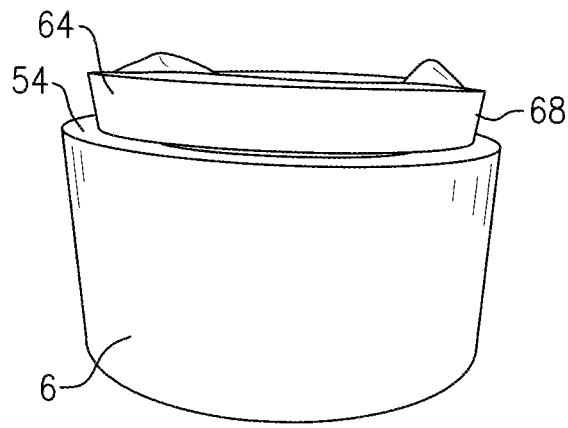
FIG. 6B is a plan view of the ball joint shown in FIG. 5A following the pull-out performance test.

FIGS. 5A 6B show the ball joint 2 before and after running a test which quantifies the pull-out performance of the ball joint 2. FIGS. 5A and 5B show the ball joint 2 prior to running the test. The ball joint 2 is shown in a normal operating arrangement with the joint ball 18 accommodated within the housing 6 and the ball stud 4 extending through the outlet opening 22. As described above, the ball joint 2 has a press-on ring 64 which strengthens, reinforces or braces the neck 50 of the housing 6. In testing the pull-out performance of the ball joint 2, the housing 6 is fixed in position between two base plates 80 of the testing apparatus while the ball stud 4 is coupled to a mechanism that applies a tensile stress or force on the ball joint 2, i.e., applies a force on the ball stud 4 along the longitudinal axis 8 in a direction away from the housing 6. The amount of tensile stress or force applied to the ball joint 2 at the time the ball joint 2 fails, i.e., when the joint ball 18 is pulled out of the housing 6, is representative of the pull-out performance of the ball joint 2 and is measured in Newtons. FIGS. 6A and 6B show the condition of the housing 6 and press-on ring 64 following failure of the ball joint 2, i.e., after the joint ball 18 has been pulled out of the housing 6. As can be seen in these figures, the press-on ring 64 as well as the neck 50 of the housing 6 have been forced or rather stretched radially outward as the joint ball 18 was pulled through the outlet opening 22. It can be seen that the press-on ring 64, e.g., the exterior surface 68 of the press-on ring 64 is angled radially outward from the lower end to the upper end of the press-on ring 64. To demonstrate the benefits of the ball joint according to the invention, the pull-out performance test was run a number of times on ball joints having housings made of a nonferrous material such as aluminum. For the purposes of comparison, tests were run on ball-joints both with and without a press-on ring arranged on the neck of the housing. The pull-out performance results of the ball joints comprising a press-on ring as described above were compared to the pull-out performance results of ball joints that did not comprise a press-on ring. The pull-out performance tests of the ball joints comprising the press-on ring had an average pull-out performance of 41.75 kN with a minimum and average increase of 6.1 kN and 10.75 kN, respectively, in comparison to pull-out performance tests of identical ball joints with no press-on ring.

The above described ball joint comprising a press-on ring are advantageous for use in applications in which the housing of the ball joint is typically made from a non-ferrous material. For example, the ball joint comprising the press on ring could be utilized in suspension and steering systems of a vehicle including a vehicle chassis assembly for coupling an aluminum transverse control arm and a wheel carrier as or coupling opposite non-ferrous ends of a tie-rod in a steering mechanism of a vehicle.

While various embodiments of the present invention have been described in detail, it is apparent that various modifications and alterations of those embodiments will occur to and be readily apparent to those skilled in the art. However, it is to be expressly understood that such modifications and alterations are within the scope and spirit of the present invention, as set forth in the appended claims. Further, the invention(s) described herein is capable of other embodiments and of being practiced or of being carried out in various other related ways. In addition, it is to be understood that the phraseology and terminology used herein is for the purpose of description and should not be regarded as limiting. The use of "including," "comprising," or "having," and variations thereof herein, is meant to encompass the items listed thereafter and equivalents thereof as well as additional items while only the terms "consisting of" and "consisting only of" are to be construed in a limitative sense.

The foregoing description of the embodiments of the present disclosure has been presented for the purposes of illustration and description. It is not intended to be exhaustive or to limit the present disclosure to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

I claim:

1. A ball joint comprising:
   a ball stud having a joint ball fixed at one end thereof;
   a housing defining a longitudinal axis and having an interior area for receiving the joint ball and a socket that is positioned between the housing and the joint ball, the housing having opposed first and second open ends, the first open end having a diameter larger than the joint ball to facilitate receiving the ball joint and the socket while the second open end having a diameter smaller than the joint ball, to facilitate retaining the joint ball within the housing, but larger than the ball stud, to facilitate passage of the ball stud therethrough, when the joint ball is received within the interior area of the housing;
   the housing having a neck comprising an outer annular surface surrounding the second open end of the housing, the neck having an axial length that extends axially from a lateral surface to an axial extent of the housing at the second open end of the housing;
   a press-on ring engaging with the outer annular surface of the neck to reinforce the second open end and resist enlargement of the diameter of the second open end and thereby increase a pull-out performance of the ball joint, and the press-on ring having an axial length that is either equal to or greater than the axial length of the neck; and
   a sealing bellows having a first end coupled to the ball stud and a second end that mates with an entirety of an exterior of the press-on ring that is not in contact with the housing.

2. The ball joint according to claim 1, wherein the housing being formed from a first material and the press-on ring being formed from a second material, and the second material having a relatively higher modulus of elasticity than a modulus of elasticity of the first material.

3. The ball joint according to claim 1, wherein the outer annular surface of the neck having a cylindrical outer surface and the press-on ring being cylindrical and having an interior surface that mates with the outer annular surface of the neck of the housing.

4. The ball joint according to claim 3, wherein the neck of the housing being formed from a first material having a lower modulus of elasticity in comparison to a modulus of elasticity of a second material from which the press-on ring is formed.

5. The ball joint according to claim 1, wherein the second end of the sealing bellows being mold bonded to the exterior of the press-on ring such that the press-on ring is entirely encased by the second end of the sealing bellows and the housing.

6. A ball joint comprising:
a ball stud having a joint ball fixed at one end thereof;
a housing defining a longitudinal axis and having an interior area which receives the joint ball of the ball stud and a socket that is positioned between and mates with an inner surface of the housing and an outer surface of the joint ball so as to rotatably and pivotally fix the joint ball within the interior area of the housing, the housing having an open end comprising an opening through which the ball stud extends when the joint ball is received within the interior area of the housing, the opening in the open end of the housing extending laterally with respect to the longitudinal axis and having a diameter that is smaller than a diameter of the joint ball such that the socket and the joint ball are captively retained within the interior area of the housing, and the open end of the housing forming an axially extending neck that extends from a laterally extending surface of the housing to an axially outermost face of the housing, which define an axial length of the neck;
a press-on ring radially surrounding the neck along the entire axial length of the neck, and the press-on ring mating with an outer surface of the neck, the housing being formed from a first material and the press-on ring being formed from a second material such that the press-on ring has a relatively higher modulus of elasticity in comparison with a modulus of elasticity of the housing so as to increase an amount of tensile stress placed on the ball joint between the ball stud and the housing before the joint ball is pulled-out of the interior area of the housing; and
a sealing bellows having a first end coupled to the ball stud and a second end that mates with an entirety of an exterior of the press-on ring that is not in contact with the housing.

7. The ball joint according to claim 6, wherein the lateral surface extends perpendicularly with respect to the longitudinal axis, and the outer surface of the neck mating with an interior surface of the press-on ring forming an interference fit therebetween.

8. The ball joint according to claim 7, wherein the press-on ring having an axial length that is at least as long as the axial length of the neck.

9. The ball joint according to claim 6, wherein the outer surface of the neck having a cylindrical surface and a chamfered surface extending from the cylindrical surface to the axially outermost face of the housing, and an interior surface of the press-on ring mates with at least an entire axial extent of the cylindrical surface of the neck.

10. The ball joint according to claim 6, wherein the outer surface of the neck mating with an interior surface of the press-on ring forming an interference fit therebetween, and a sealing bellows having a first end coupled to the ball stud and a second end that mates with an exterior surface of the press-on ring and with the neck for sealing the opening of the housing from an exterior of the sealing bellows.

11. The ball joint according to claim 10, wherein the second end of the sealing bellows mates with a chamfered surface and the lateral surface of the housing such that the press-on ring is entirely encased by the sealing bellows and the housing.

12. The ball joint according to claim 7, wherein the press-on ring and the second end of the sealing bellows each abutting the lateral surface of the housing.

* * * * *